United States Patent [19]
Deffenbaugh

[11] 3,816,695
[45] June 11, 1974

[54] FLASH WELDERS

[75] Inventor: James F. Deffenbaugh, Warren, Ohio

[73] Assignee: Wean United, Inc., Pittsburgh, Pa.

[22] Filed: Aug. 2, 1973

[21] Appl. No.: 384,797

[52] U.S. Cl. .............................................. 219/100
[51] Int. Cl. ............................................ B23k 11/04
[58] Field of Search .............. 219/97, 100, 101, 107

[56] References Cited
UNITED STATES PATENTS 3,036,202   5/1962   Stieglitz et al. ....................... 219/97
3,227,851   1/1966   Greenberger ......................... 219/97

Primary Examiner—J. V. Truhe
Attorney, Agent, or Firm—Michael Williams

[57] ABSTRACT

A flash welder, particularly adaptable for welding two metal sheets of unequal thickness. The invention incorporates means for automatically aligning the horizontal centers of the mating edges of two sheets of unequal thickness within close tolerances, without requiring any manual operation on the part of an operator. The invention also enables optimum welding of two metal sheets that have cross-sections which vary from side edge to side edge.

11 Claims, 5 Drawing Figures

FLASH WELDERS

BACKGROUND AND SUMMARY

In prior practice, when flash welding two metal sheets of unequal thickness, it was customary to maintain the lower surfaces of the sheets at the line of weld in the same horizontal plane. This resulted not only in an inferior weld, but also produced a decided enlargement at the weld since the excess of the thicker sheet extended only from one side. Such enlargement might cause difficulties in subsequent strip processing equipment, whereas if the excess were equally divided on opposite sides of the strip, the difficulties were largely overcome.

Modern flash welding machines do provide for vertical adjustment of one of the conventional clamping dies sets so that it is physically possible to equalize the difference in sheet thicknesses. However, it is very difficult for a machine operator to make such adjustment within the time interval considered practical for the usual sheet joining process. Further, it is very difficult for a machine operator to accomplish any accuracy in equalizing adjustment since only the front edges of the two strips visible available to him and he must therefore estimate the rear or opposite side edge alignment by sighting along the top surfaces of the mating ends.

My invention provides means for automatically and accurately aligning the horizontal centers of the mating edges of two metal sheets to be joined. As in conventional design, the improved flash welder of my invention includes pairs of upper and lower clamps, each pair being adapted to clamp against the upper and lower surfaces of a sheet to be welded. Thus, the lower clamps provide lower clamping surfaces to support the respective mating ends of the two sheets to be flash welded. The upper clamps provide opposing surfaces which are movable vertically relative to the lower clamping surfaces. In preparation for and during welding operation, the sheets are firmly clamped between the lower and opposing clamping surfaces of respective pairs of clamps, and center alignment is accomplished by vertical movement of one of the pair of clamps, preferably the set which is held stationary during the welding operation. The vertical movement to accomplish center alignment is effected by a power operated device controlled by electrical circuitry which is responsive to the unequal thickness of the sheets.

DESCRIPTION OF THE DRAWINGS

In the drawings accompanying this description and forming a part of this application, there is shown, for purposes of illustration, an embodiment which my invention may assume, and in these drawings:

FIG. 3 is a fragmentary, sectional view, showing in somewhat exaggerated manner, a flash weld produced between sheets of unequal thickness when the lower surfaces of the sheets are in a common plane, as is the case in the prior art, FIG. 4 is a view similar to FIG. 3, but showing a weld produced between two sheets of unequal thickness when the sheets are welded in accordance with my invention, and FIG. 5 is a fragmentary view of two separated sheets which may be welded through use of my invention, wherein the sheets have varying cross-sectional thickness.

DESCRIPTION OF THE PREFERRED EMBODIMENT

Figure 1:
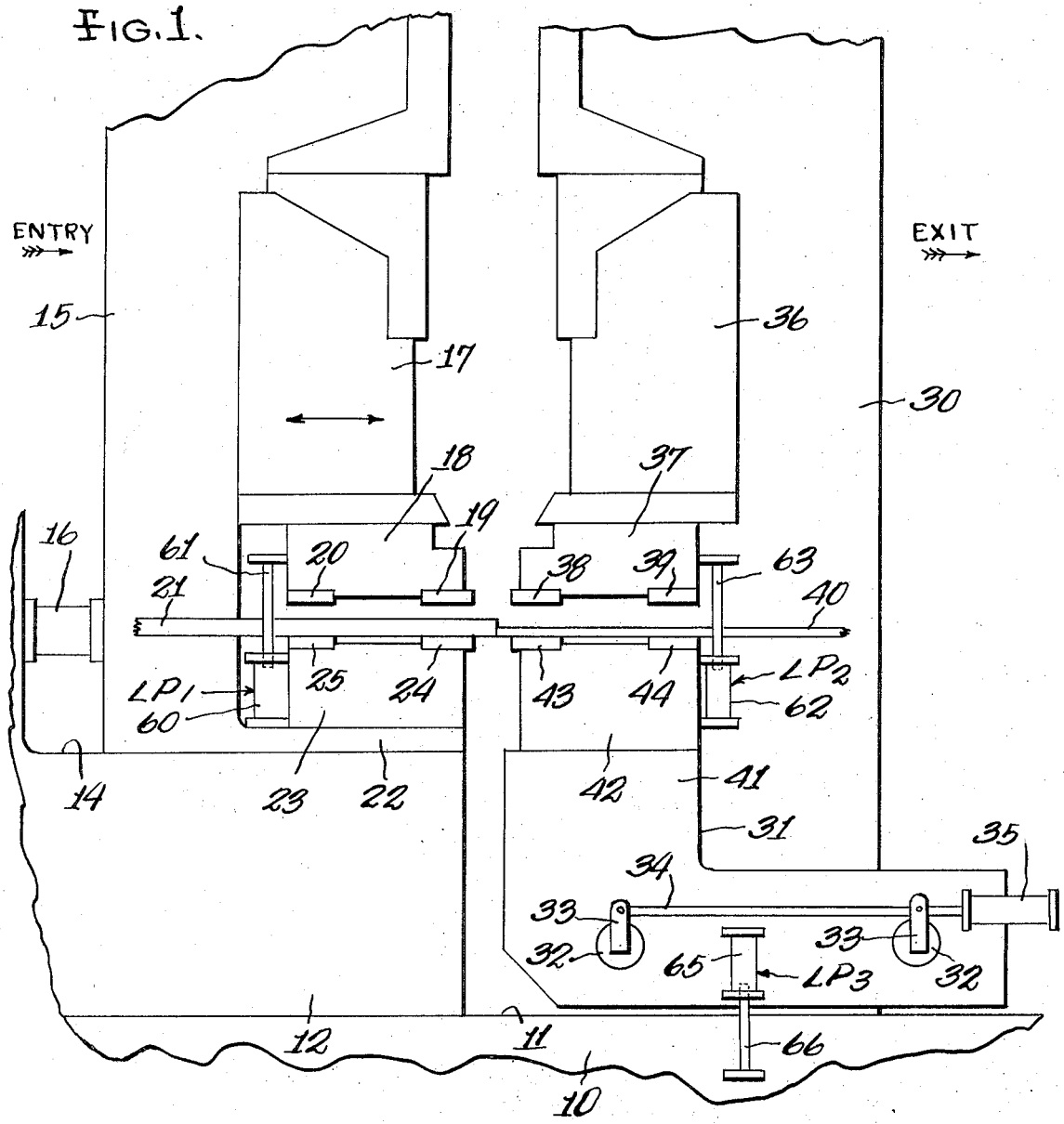
FIG. 1 is a generally schematic representation of a flash welder, illustrating sufficient structure to enable an understanding of my invention.

With reference to FIG. 1, the flash welder herein disclosed comprises a base 10 providing a bed surface 11. Fixed to the base and extending upwardly from the bed surface is a sub-base 12 having a horizontal slide surface 14 on its upper end. An upstanding housing 15 of convention design is slidably mounted on the slide surface 14 for horizontal sliding movement. Power for moving the housing 15 may be in the form of a hydraulic cylinder 16 of usual construction. The housing 15 supports a vertical slide 17 to which is fixedly connected the upper weld clamp 18. This clamp has a copper or copper alloy insert 19 at its toe portion, and preferably a steel insert 20 at its heel portion. The lower flat surfaces of the inserts 19 and 20 lie in a common horizontal plane and are adapted to engage the upper surface of the steel strip 21, inwardly of its end.

Fixedly mounted on a pad 22 provided by the housing 15 is a lower weld clamp 23 which is vertically aligned with the upper clamp 18 and has a copper or copper alloy insert 24 and a steel insert 25. The inserts 24 and 25 have upper flat surfaces which lie in a common horizontal plane, and are adapted to cooperate with the inserts 19 and 20 to firmly clamp the strip 21 therebetween. The slide 17 is moved vertically in conventional manner, such as by means of a hydraulic cylinder (not shown).

A second upstanding housing 30 is arranged in cooperating relationship with the housing 15, and this housing is mounted on a sub-base 31 which is supported from the side bars (not shown) of the base 10 for vertical movement. As suggested in FIG. 1, a pair of eccentric drums 32 are journalled in the sub-base 31 and have stub shafts (not shown) journalled in the side bars of the base 10. Each drum 32 has a rigidly affixed arm 33, and these arms are connected by a rod 34 which is driven horizontally by a double acting hydraulic cylinder 35. It will therefore be understood that as the rod 34 is driven one way or the other, the sub-base 31 will be moved vertically.

As in the case of the housing 15, a vertical slide 36 is supported by the housing 30, and the upper weld clamp 37 is fixed to the lower end of the latter. This clamp has a copper or copper alloy insert 38 at its toe portion, and a steel insert 39 at its heel portion. The lower surfaces of the inserts 38 and 39 lie in a common horizontal plane and are adapted to engage the upper surface of the steel sheet 40.

Fixedly mounted on a pad 41 extending upwardly from the sub-base 31 is a lower weld clamp 42 which is vertically aligned with the upper clamp 37 and has a copper or copper alloy insert 43 and a steel insert 44. The inserts 43 and 44 have upper flat surfaces which lie in a common horizontal plane, and are adapted to cooperate with the inserts 38 and 39 to firmly clamp the metal sheet 40 therebetween. The slide 36 is moved vertically in conventional manner, such as by means of a hydraulic cylinder (not shown).

In normal flash welding operations, the clamp sets are open, as shown in FIG. 1. The metal sheets 21 and 40 are inserted from opposite ends of the machine and their adjoining ends are spaced a predetermined distance (such as by a conventional gauge bar not shown), and the clamps 18 and 23 are closed on the sheet 21 at the time the clamps 37 and 42 are closed on the sheet 40. A switch is closed as the housing 15 is moved horizontally toward the stationary housing 30 to cause flashing between the strip ends, and an upset stroke is applied to the housing 15 to integrally join the adjoining end portions of the sheets 21 and 40. Both sets of clamps are then opened, and the joined sheets move through the machine.

When the two metal sheets are substantially the same thickness, a good weld is effected. However, when the sheets are of unequal thickness, and the lower surfaces of the sheets are held in a common horizontal plane during welding (as is customary in conventional flash welding) the thinner sheet T, as seen in FIG. 3, tends to dig into the lower corner of the thicker sheet S, as seen at 50, on the upset stroke. This not only results in a poor weld, but also provides a weld ridge at 50 which extends transversely at the weld line. Thus, the joined sheets not only have a transverse shoulder 51 at the upper surface, but also have the transverse ridge 50 at the lower surface. Quite frequently, the transverse shoulder alone is sufficient to interfere with subsequent processing of the joined sheets.

In use of my invention, the horizontal centerline of the thin sheet T is automatically shifted to align with the horizontal centerline of the thicker sheet S, after the clamps have been closed on both sheets but prior to the start of welding. This condition is shown in FIG. 4, wherein it will be noted that only small transverse shoulders 52 are formed on opposite sides of the joined sheets, and these frequently present no problem in subsequent sheet processing. Furthermore, since the end of the thin sheet T is upset into the midportion of the thicker sheet S, a good weld is effected and no transverse ridge, as that shown at 50 in FIG. 3 is formed. My invention even makes it possible to form a good weld between a pair of sheets having mating ends of the character shown in FIG. 5. In this case, the sheet Sa has a wide longitudinal edge portion 56, and is to be joined to a sheet Ta which has a narrow longitudinal edge portion 57 and an opposite wider longitudinal edge portion 58. In use of my invention, the vertical movable clamp set will be automatically canted so that the horizontal centerlines of the sheets align.

Attention is now directed to the means for automatically aligning the horizontal centerlines of the sheets. The construction of the machine is such that the upper surfaces of the die inserts 24,25 of the fixed lower clamp 23 are constant relative to any one point on the machine frame. The upper surfaces of the die inserts 43,44 of the lower clamp 42 are constant relative to any one point on the vertically movable sub-base 31 which supports this lower clamp. Thus, the relative vertical positions of the upper insert surfaces of the two lower clamps may be determined by measuring vertical positions of the points on the fixed machine frame and the vertically movable sub-frame 31. This measurement is made by an electromechanical displacement device, such as a linear potentiometer or linear variable differential transformer, either of which provides an electrical signal which is proportional to the physical displacement between the fixed and movable sections of the same. Potentiometers and transformers of the type herein contemplated are commercially available and therefore it is believed that detailed description of the same is unnecessary.

In the embodiment disclosed, six measurements or indications of distance are required for the automatic alignment system. Three of these measurements are made at the near, or operator's side of the sets of weld clamps, and three are made at the far side of such clamps. Since each of the two groups of three measurements are identical, only the operation of the near group will be described.

In FIG. 1, linear potentiometers are disclosed. One potentiometer LP2 is shown at the heel side of the clamps 37,42, and another potentiometer LP1 is shown at the heel side of the clamps 18, 23. The precise location of these potentiometers is believed to be of no great importance, but since the steel inserts at the heel portions of the clamps resist wear to a greater extent than the copper or copper alloy inserts, it is presently found preferable to locate the potentiometers at the heel portions of the clamps.

Referring to FIG. 1, the fixed portion 60 of potentiometer LP1 is secured to the lower clamp 23 and the movable portion 61 is secured to the upper clamp 18. Likewise, the fixed portion 62 of potentiometer LP2 is secured to the lower clamp 42 and the movable portion 63 is fixed to the upper clamp 37. It will be appreciated that the fixed and movable portions of each potentiometer may be reversed, such as for example, the fixed portion 60 may be secured to the upper clamp 18 and the movable portion 61 may be fixed to the lower clamp 23. The third linear potentiometer LP3 determines the relative vertical positions of the upper insert surfaces of the two lower clamps 23 and 42 by measuring the relative vertical position of points on the machine frame and the vertically movable sub-frame 31. As seen in FIG. 1, the fixed portion 65 of the potentiometer LP3 is secured to the sub-frame 31 and the movable portion 66 is secured to the machine frame. Again, the parts may be reversed. The electrical signal from potentiometer LP3, when properly scaled, will indicate the relative vertical positions of the adjoining edges of the upper surfaces of the two lower clamps 23, 42 with an accuracy of plus or minus 0.002 inches over a displacement of plus or minus 0.250 inches.

Potentiometer LP2 provides an indication to an accuracy of plus or minus 0.001 inches, of the vertical separation of the upper insert surfaces of the lower clamp 42 and the associated lower insert surfaces of the upper clamp 37. Potentiometer LP1 provides an indication to an accuracy of plus or minus 0.001 inches, of the vertical separation of the upper insert surfaces of the lower clamp 23 and the associated lower insert surfaces of the clamp 18.

Figure 2:
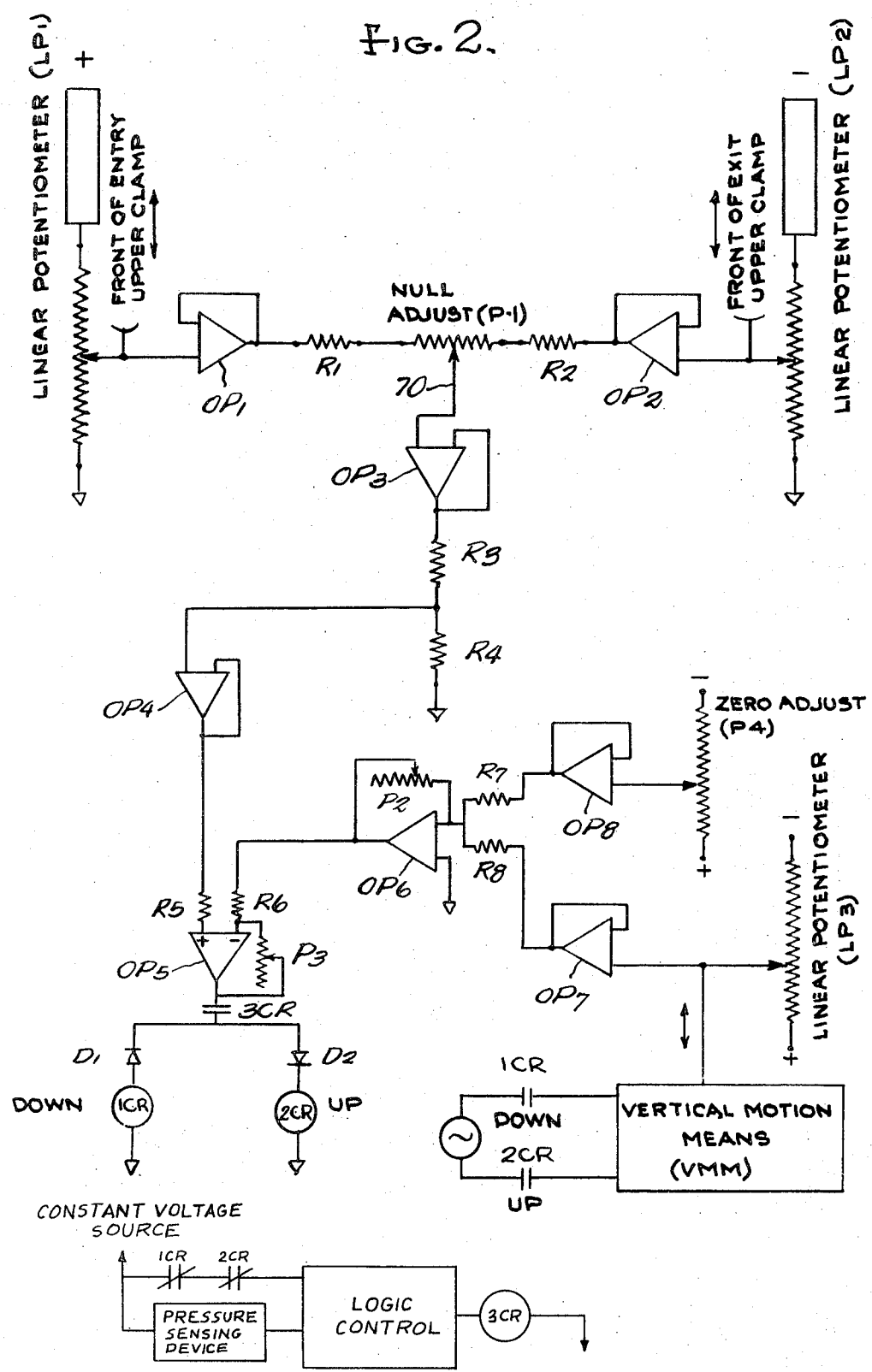
FIG. 2 is an electrical diagram illustrating circuitry for cooperation with various parts shown in FIG. 1.

The electrical diagram shown in FIG. 2 utilizes the linear potentiometers above mentioned although, as previously pointed out, the electromechanical measuring devices may be of any type which produces an electrical signal proportional to the physical displacement between the fixed and movable sections of the device.

Using the linear potentiometers shown, a direct current voltage is applied to potentiometers LP1 and LP2 so that upward motion of the upper clamp of the respective sets relative to the lower clamp surfaces will produce a greater voltage relative to the control system ground. However, the polarities must be opposite as shown in FIG. 2. The polarities may be interchanged if the vertical motion means VMM and the potentiometer LP3 are also changed from that shown in the circuit diagram of FIG. 2. The vertical motion means VMM corresponds to the hydraulic cylinder 35 shown in FIG. 1. The voltages of both potentiometers LP1 and LP2 are adjusted so that a voltage of 1.000 plus or minus 0.0005 volts per inch of transducer length is applied.

The physical length of the potentiometers or transducers LP1 and LP2 are made slightly longer than the total movement of the upper clamps of the respective clamp set. Thus, the position signal will be greater than zero (circuit ground) and less than the applied voltage. Assuming that the upper clamps of each set are lowered until the upper and lower insert surfaces of the upper and lower clamps are in contact, and depending upon the physical mounting of the potentiometers LP1 and LP2 relative to each other, the output signals from such potentiometers may be arithmetically equal or different.

During calibration, a digital voltmeter (not shown) with a resolution of 0.000 plus or minus 0.0001, is connected from the output of buffer OP3 (of any suitable commercially available type) to the circuit ground and the null adjustment potentiometer slider 70 is moved until the output of buffer OP3 is within plus or minus 0.0005 volts of zero. Buffer OP3 is connected in circuit with non-inverting gain buffers OP1 and OP2 so that the gains of all three are unity; thus any gap difference between the clamp sets (caused by sheet of unequal thickness) will produce a signal at the output of buffer OP3, having a scale of 1.00 plus or minus 0.001 volts per inch of gap difference. It will be appreciated that a different scale may be used, such as 10 volts per inch of gap difference.

As the polarities of the outputs of the non-inverting unity gain buffers OP1 and OP2 are opposite, the output of buffer OP3 will be equal to the difference in the two clamp sets with a negative polarity existing if the front exit clamp gap is greater (LP2 signal) and positive if the front entry clamp gap is greater (LP1 signal).

The purpose of the buffers OP1 and OP2 is to reduce the electrical loads imposed on potentiometers LP1 and LP2 so that their output signals are not appreciably shifted due to loading. The outputs of buffers OP1 and OP2 are fed to the opposite ends of a voltage divider which is composed of two fixed resistors R1 and R2 and potentiometers P1. The fixed resistors limit the adjustment range of potentiometer P1 and results in a smaller divider ratio per degree of potentiometer movement.

Since the vertical correction required in the two sets of welding clamps should be equal to one half the gap difference (or one half the difference in the thicknesses of the two sheets), the output of buffer OP3 is divided by two by means of a resistance voltage divider R3 and R4. The output of this divider is fed to a unity gain buffer OP4 to minimize loading on resistor R3. The output of buffer OP4 is equal to one half of the gap difference with a scale of 1.00 plus or minus 0.001 volts per inch of difference. The output of buffer OP4 is fed to the non-inverting input of OP5 through resistor R5. OP5 acts as a high gain voltage comparator with the output of OP4 as the base voltage to which the output signal of OP6 is compared.

Linear potentiometer LP3 measures the vertical displacement between the upper surfaces of the near ends of the two lower clamps. The voltage fed to LP3 is adjusted so that a voltage of 1.000 plus or minus 0.0005 per inch of transducer length is applied. Upward motion of the clamp set carried by the sub-base 31 will produce increasing negative voltage. Since this is the same scale that is used for potentiometers LP1 and LP2, an equal change in slider position will result in equal changes in voltage signal for all three transducers. The output of potentiometer LP3 is fed through buffer OP7 to summing resistor R8 and then to the inverting input of OP6.

The vertical motion means VMM (cylinder 35) is manually energized so as to vertically move the near end of the lower clamp 41 until the upper surfaces of the die inserts of the two lower clamps 23 and 42 are in the same horizontal plane. Potentiometer LP3 must be physically adjusted so that it is near the center of its total travel. The output voltage signal of potentiometer LP3 will now be either a positive or negative voltage greater then zero and less then the maximum applied voltages or zero. This will appear at the output of OP6 in the opposite polarity.

To calibrate the electrical system, the output of OP6 must be made to be zero when the upper surfaces of the die inserts of the lower clamp 23 and 42 are in the same horizontal plane. To do this, a voltage is fed to the non-inverting input of buffer OP8 from potentiometer P4 and adjusted in magnitude until the output of OP6 is zero plus or minus 0.0005 volts, using the same voltmeter that was used to adjust the null position of potentiometer P1. During this adjustment procedure, the gain of OP6 is set to maximum.

OP6 is used as an inverting summing amplifier and will produce an output with a value equal to the inverse of the algebraic sum of the two input voltages fed to resistors R7 and R8. With the voltmeter still connected so as to measure the output of OP6, the vertical motion means VMM (cylinder 35) is manually energized so as to produce a measured motion to linear potentiometer LP3. Gain potentiometer P2 is then adjusted until the output voltage change of OP6 is equal to the motion change of linear potentiometer LP3 to within 1.00 plus or minus 0.001 volts per inch. The output of OP6 is fed to the inverting input of OP5 through resistor R6.

OP5 is used as a high gain voltage comparator, and its action is as follows: Assume that linear potentiometer LP3 is positioned so that its output is zero (this occurs when the upper surfaces of inserts of lower clamps 23 and 42 are in the same horizontal plane) and that a 0.125 inch sheet 21 is clamped in the fixed clamp set 18,23 and a 0.0625 inch thick sheet 40 is clamped in the movable clamp set 37,42, linear potentiometer LP1 produces an output change of 0.125 volts positive and linear potentiometer LP2 produces an output of 0.0625 volts negative. The output of buffer OP4 will be equal to one half of the algebraic sum of the changes, or 0.03125 volts positive.

Since the gain of OP5 is very high, its output will saturate at a positive polarity as soon as a positive voltage appears at its non-inverting input. This output will forward bias diode D2 and energize relay 2CR. The normally open contacts of 2CR close to energize the vertical motion means VMM to move the clamp set 37,42 upward. Since the 0.0625 inch sheet 21 is held by this clamp set, upward motion is correct. As this motion continues, the output of linear potentiometer LP3 becomes more negative, and the output of OP6 more positive. When the arithmetical value of OP6 output equals the output of buffer OP4, the output of OP5 drops to zero, de-energizes relay 2CR and stops the vertical motion of clamp set 37,42. The two sheets 21,40 are now vertically positioned so that their horizontal centerlines are in the same plane within plus or minus 0.005 inches, due to adjustment tolerances, plus or minus 0.0075 inches due to transducer linearity tolerances, or a total of plus or minus 0.0125 inches. Greater accuracy can be obtained, if required, by using transducers with better linearity.

The gain of OP5 is adjusted by negative feed-back potentiometer P3 to a gain which will provide operation of relays 1CR and 2CR with an input difference at OP5 of 0.002 volts and will prevent hunting of the vertical motion means VMM if the clamp set positioning velocity does not exceed 0.010 inches per second.

If the clamp gap of the vertically movable clamp set 37,42 were greater, that is if the thicker sheet were clamped in this set, the polarity applied to resistor R5 would be negative and relay 1CR would be energized to lower this clamp set. If both gaps are equal, that is if both clamped sheets are the same thickness, no signal would be applied to resistor R5 and either relay 1CR or 2CR will be energized if the vertically movable clamp set 37,42 is high or low as a result of a previous adjustment.

The normally open contact of relay 3CR is placed in series with relay coils 1CR and 2CR to prevent operation of the adjustment system until pressure sensing devices (commonly used in strip clamping means) signal that the clamping sets have clamped both sheets. Relay 3CR is de-energized when either relay 1CR or 2CR is de-energized, or when a time delay (not shown) which started to time when the clamping pressure sensing devices operate, times out. The time delay is desirable in the event that neither relay 1CR or 2CR is required to operate. De-energization of relay 1CR or 2CR, or expiration of the time delay, provides a signal to continue with the remainder of the welding sequence. These interlocking actions may be provided by simple logic systems well known to those skilled in the art.

The vertical motion means VMM may be electro-hydraulic, or electromechanical. The electro-hydraulic means may comprise a double-acting cylinder (such as cylinder 35 shown in FIG. 1) and a double solenoid, four port valve with spring return to a blocked center (not shown but commonly used in flash welders). When the valve is de-energized, a hydraulic, air or mechanical clamp (not shown) would be employed to prevent motion of the cylinder due to leakage. Electromechanical vertical motion means could take the form of an electric motor of any suitable type, operating through proper gearing. An electromechanical brake would be used to prevent motion when it is not desired.

The linear potentiometers LP1, LP2 and LP3 in circuit with one like that shown in FIG. 2, would be provided at the far side of the clamping sets (that side opposite the operator's side) and would function in the manner above described. Thus, if one or both of the sheets to be welded has an uneven cross-section, as suggested in FIG. 5, the near and far sides of the vertically movable clamping sets 37,42 would be automatically adjusted to compensate.

I claim:

1. A method of automatically adjusting the two sets of welding clamps of a flash welder for welding two metal sheets of unequal thickness so that the horizontal thickness of the edge of the thinner sheet will be arranged to be welded to the edge of the thicker sheet intermediate the horizontal thickness of the latter, said welder having one set of clamps mounted on a support which in turn is mounted on a fixed base for vertical movement, and vertical motion means for moving said support, said method comprising:

engaging the sets of welding clamps on respective sheets, measuring in electrical values the amount of gap of the set clamped on the thicker sheet, and measuring in the same electrical values the amount of gap of the set clamped on the thinner sheet, translating the two electrical values to an electrical calculating circuit which correlates the same and automatically divides the correlation in a predetermined amount, and translating the predetermined divided amount to electrical circuitry which controls operation of said vertical motion means to relatively move said two sets of clamps an amount wherein the horizontal thickness of the edge of the thinner sheet is disposed intermediate the upper and lower horizontal surfaces of the edge of the thicker sheet.

2. The method according to claim 1 wherein the gaps of the two sets of clamps are measured in volts.

3. The method according to claim 1 wherein said electrical calculating circuit divides said correlated values in substantially one half.

4. The method according to claim 1 wherein the arithmatical difference in the electrical values is translated to said calculating circuit.

5. The method according to claim 4 wherein said calculating circuit divides said difference substantially one half.

6. A method of automatically adjusting the two sets of welding clamps of a flash welder for welding two metal sheets of unequal thickness, said welder having one set of clamps mounted on a support which in turn is mounted on a fixed base for vertical movement, and vertical motion means for moving said support, said method comprising:

engaging the sets of welding clamps on respective sheets, measuring in volts the amount of gap of the set clamped on the thicker sheet, and measuring in volts the amount of gap of the set clamped on the thinner sheet, conducting the measured volts of the two gaps to respective non-inverting unity gain buffers of opposite polarity and connected in a circuit including a third buffer so that the voltage output of the latter is equal to the difference between the measured volts of the gaps of the clamps on the thicker and thinner sheets, conducting the voltage output of said third buffer to a voltage divider which is adjusted to divide in half the output of said third buffer, and translating such half voltage to electrical circuitry which controls operation of said vertical motion means to relatively move said two sets of clamps an amount wherein the horizontal centerline of the edge of the thinner sheet is aligned with the horizontal centerline of the edge of the thicker sheet.

7. A flash welder for welding two metal sheets of unequal thickness, said welder having two sets of welding clamps, one set to be clamped on each sheet, one set of clamps being mounted on a sub-base which in turn is mounted on a base for vertical movement, vertical motion means for moving said sub-base to in turn move said one set of clamps vertically and relative to the other set so that when sheets of unequal thickness are clamped in said clamps, one sheet may be moved vertically relative to the other for predetermined horizontal alignment, a plurality of electromechanical displacement devices, each having fixed and movable sections and each of which produces an electrical signal proportional to the physical displacement between its fixed and movable sections, a first one of said devices having its fixed and movable sections connected between the clamps of said one set so that such sections are physically displaced in proportion to the movement of the clamps, a second one of said devices having its fixed and movable sections connected between the clamps of said other set so that such sections are physically displaced in proportion to the movement of the clamps, and a third one of said devices having its fixed and movable sections connected between said sub-base and base so that such sections are physically displaced in proportion to the vertical movement between said sub-base and base, said first, second and third devices being electrically connected in an electrical circuit wherein unequal electrical signals from said first and second devices cause operation of said vertical motion means until the signal from said third device caused by movement of said sub-base relative to said base reaches a predetermined value.

8. The construction according to claim 7 wherein said electromechanical displacement devices are linear potentiometers.

9. The construction according to claim 7 wherein said flash welder has a near side at which the operator of the welder is normally positioned, and an opposite far side, one group of first, second and third displacement devices being located at the near side of said welder and a similar group of first, second and third displacement devices being located at the far side of said welder, each group being in a separate electrical circuit.

10. The construction according to claim 7 wherein each set of clamps has steel inserts at the heel portion, and said first and second devices being connected between clamps of the respective set at the heel portion thereof.

11. The construction according to claim 7 wherein the signal from said first device is conducted to the input of a first buffer and the signal from the second device is conducted to the input of a second buffer, a first conductor between the outputs of said first and second buffers to electrically connect the same, whereby such outputs are of opposite polarity, a second conductor electrically connecting said first conductor to the input of a third buffer, the output of which is connected to ground, said first, second and third buffers being connected in electrical circuit so that the gains of all three are unity, whereby any gap difference between the clamp sets caused by sheets of unequal thickness will produce a signal at the output of said third buffer, the output of said third buffer being connected to relays which control operation of said vertical motion means.

* * * * *